US009163809B2

(12) United States Patent
Martini et al.

(10) Patent No.: US 9,163,809 B2
(45) Date of Patent: Oct. 20, 2015

(54) LIGHTING SYSTEM

(71) Applicant: OSRAM AG, Munich (DE)

(72) Inventors: Michele Martini, Spinea, VE (IT); Alessio Sagliocco, San Donà di Piave (IT); Antonio Favretto, Codognè (IT)

(73) Assignee: OSRAM GmbH, Munich (DE)

( * ) Notice: Subject to any disclaimer, the term of this patent is extended or adjusted under 35 U.S.C. 154(b) by 395 days.

(21) Appl. No.: 13/655,479

(22) Filed: Oct. 19, 2012

(65) Prior Publication Data

US 2013/0100669 A1 Apr. 25, 2013

(30) Foreign Application Priority Data

Oct. 21, 2011 (IT) .................................. TO11A0954

(51) Int. Cl.

| | |
|---|---|
| ***B60Q 1/06*** | (2006.01) |
| ***F21V 29/00*** | (2015.01) |
| ***F21V 15/01*** | (2006.01) |
| ***F21V 17/10*** | (2006.01) |
| *F21V 17/00* | (2006.01) |
| *F21V 17/18* | (2006.01) |
| *F21V 23/00* | (2015.01) |
| *F21Y 101/02* | (2006.01) |
| *F21V 29/507* | (2015.01) |
| *F21V 29/70* | (2015.01) |

(52) U.S. Cl.

CPC ............... *F21V 15/01* (2013.01); *F21V 17/104* (2013.01); *F21V 15/013* (2013.01); *F21V 17/002* (2013.01); *F21V 17/007* (2013.01); *F21V 17/18* (2013.01); *F21V 23/009* (2013.01); *F21V 29/004* (2013.01); *F21V 29/507* (2015.01); *F21V 29/70* (2015.01); *F21Y 2101/02* (2013.01)

(58) Field of Classification Search

CPC .... F21V 29/2212; F21V 29/507; F21V 29/73

USPC ............................ 362/394, 373, 249.01, 294

See application file for complete search history.

(56) References Cited

U.S. PATENT DOCUMENTS 3,116,022 A * 12/1963 Davis ............................ 362/294
7,097,332 B2 * 8/2006 Vamberi ....................... 362/405

(Continued)

FOREIGN PATENT DOCUMENTS

DE 102007009548 A1 8/2008
IT TO2011A000164 8/2012

(Continued)

OTHER PUBLICATIONS

English language abstract of DE 10 2007 009 548 A1.

*Primary Examiner* — Jong-Suk (James) Lee
*Assistant Examiner* — Bryon T Gyllstrom

(57) ABSTRACT

A lighting system may include a housing for a lighting module and at least one profiled element which can be coupled to the housing and protrudes from the housing when coupled to the housing. The housing has an external surface with a plurality of channels and comprises a plurality of seats. The profiled element may have a first engagement formation insertable into one of the channels of the housing and a second engagement formation insertable into one of the seats of the housing when the first engagement formation is inserted in the channel. Blocking means movable into a first and into a second operative position, may be.

13 Claims, 4 Drawing Sheets

(56) References Cited

U.S. PATENT DOCUMENTS

| | | | | |
|---|---|---|---|---|
| 7,695,162 | B2 * | 4/2010 | Zhang et al. | 362/294 |
| 8,226,270 | B2 * | 7/2012 | Yamamoto et al. | 362/294 |
| 2007/0070619 | A1 * | 3/2007 | Galli et al. | 362/157 |
| 2008/0089071 | A1 * | 4/2008 | Wang | 362/294 |
| 2009/0185380 | A1 * | 7/2009 | Ho | 362/294 |
| 2009/0316385 | A1 * | 12/2009 | Weber et al. | 362/92 |
| 2010/0212859 | A1 * | 8/2010 | Liang | 165/47 |
| 2010/0238655 | A1 | 9/2010 | Sloan et al. | |
| 2010/0254146 | A1 | 10/2010 | McCanless | |
| 2010/0328960 | A1 * | 12/2010 | Wang | 362/373 |
| 2011/0051430 | A1 * | 3/2011 | Chen | 362/373 |
| 2011/0216546 | A1 * | 9/2011 | Lombardi et al. | 362/365 |

FOREIGN PATENT DOCUMENTS

| | | | |
|---|---|---|---|
| WO | 2009039907 | A1 | 4/2009 |
| WO | 2012113772 | A2 | 8/2012 |

* cited by examiner

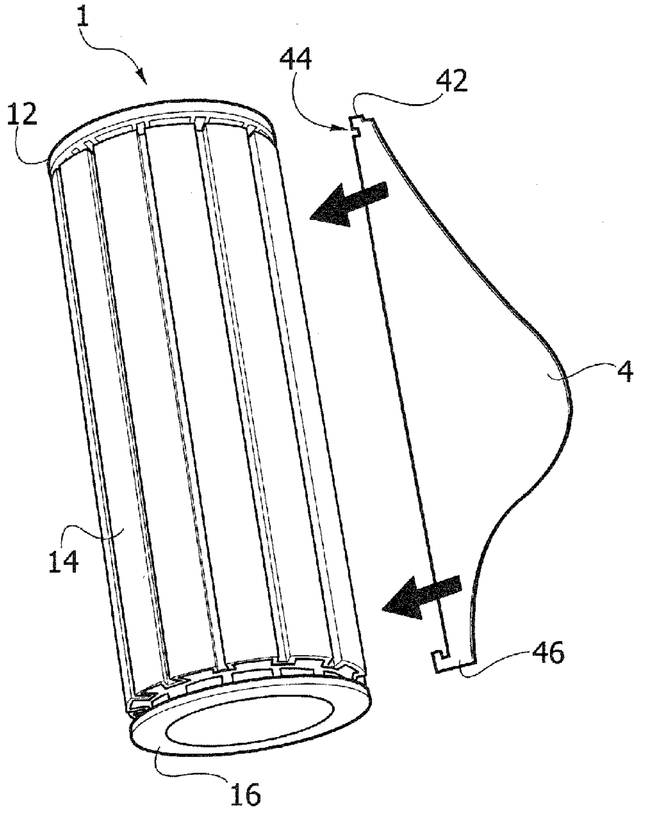
FIG. 1A
FIG. 1B
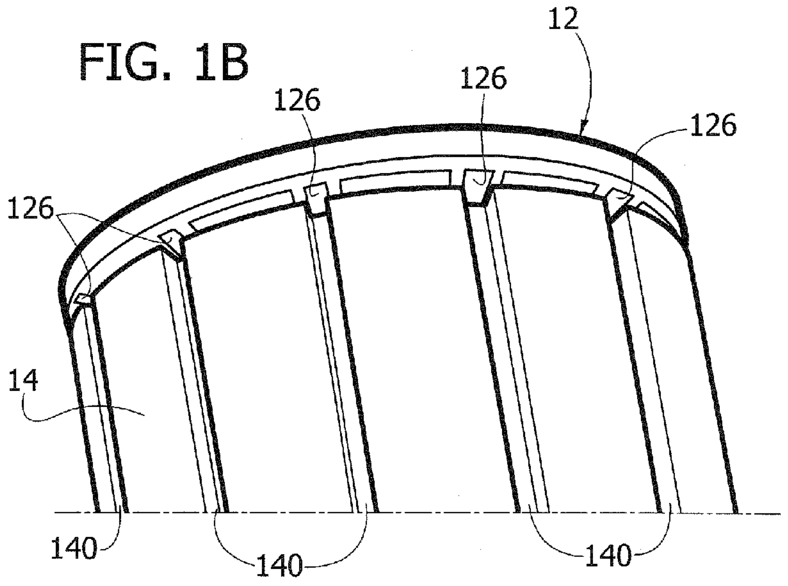

FIG. 1C
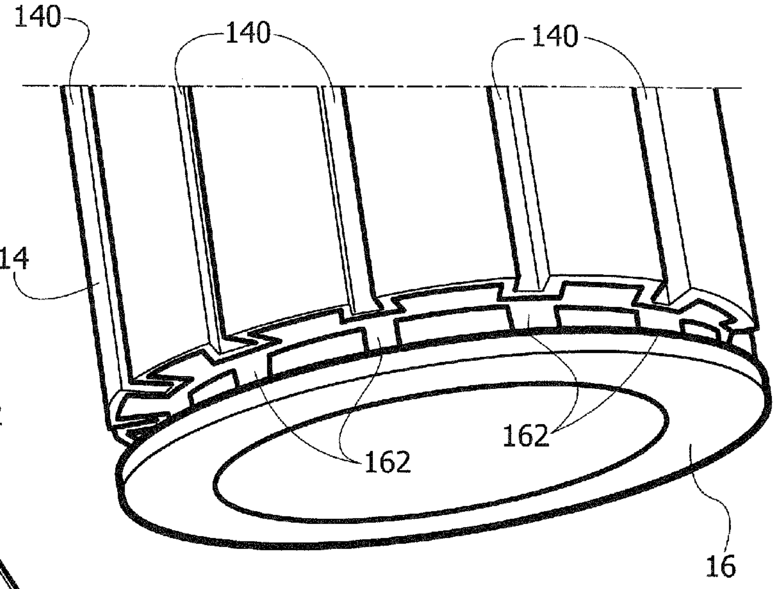
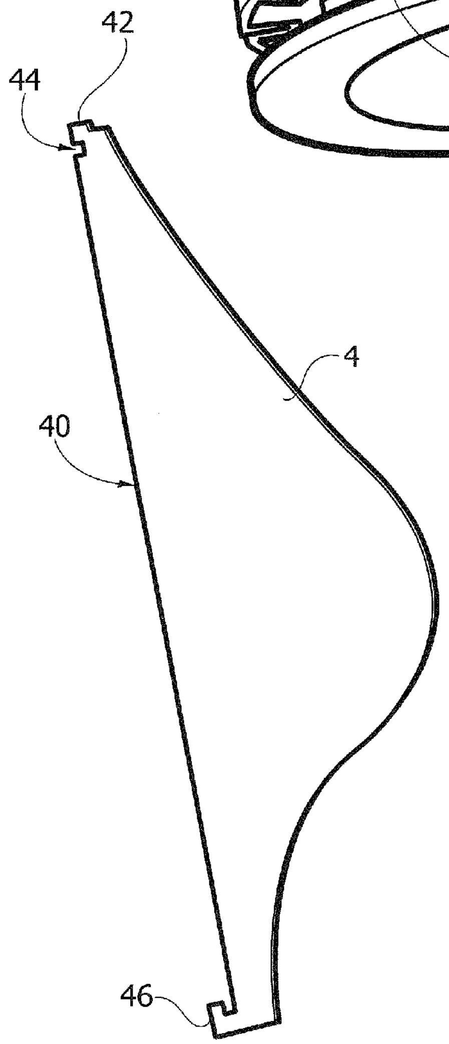
FIG. 1D

LIGHTING SYSTEM

CROSS REFERENCE TO RELATED APPLICATIONS

This application claims priority to Italian Patent Application Serial No. TO2011A000954, which was filed Oct. 21, 2011, and is incorporated herein by reference in its entirety.

TECHNICAL FIELD

Various embodiments relate to lighting systems.

BACKGROUND

Lighting systems which comprise at least one light source, such as for example one or more LEDs (Light Emitting Diodes), are known. These modules may require a cooling system to ensure stability of the LEDs over time.

By way of example, WO 2009/039907 describes a lighting system in which a cylindrical body which is made of a metallic material and comprises a plurality of longitudinal channels for the passage of air is used as a heat sink. In particular, said document highlights the fact that such a cylindrical body may have an attractive esthetic appearance, so that it does not require an external housing that covers the entire lighting system. However, this lack of an external housing means that the lighting system is not very flexible both from an esthetic and a functional point of view.

SUMMARY

A lighting system may comprise a support body for a lighting module comprising at least one light source, in which the support body has an external surface with a plurality of channels. The lighting system may also comprise at least one profiled element which can be coupled to the support body and protrudes from the support body when coupled to the support body. In particular, a profiled element has engagement formations insertable into the channels of the external surface of the support body. In a number of embodiments, the profiled elements are fixed to the support body by joining. By way of example, in a number of embodiments the support body comprises a cooling body which is closed on one side by means of a cover and on the other side by means of a support, on which the lighting module is mounted.

In particular, such cover comprises on its external surface a plurality of seats arranged along an internal circumference line, and the support comprises a flange on its external surface. On the other hand, the additional elements comprise a first portion configured for cooperating with one of the seats in the cover and a second portion comprising at least one protrusion for cooperating with the flange of the support. Even if this solution means that the lighting system is flexible both from an esthetic and a functional point of view, mechanical stability may not be always ensured.

According to aspects of the disclosure, a lighting system is disclosed having the features mentioned in the claims which follow. The claims form an integral part of the technical teaching provided here in relation to the disclosed embodiments.

In various embodiments, the lighting system comprises a housing for a lighting module comprising at least one light source. In particular, said housing has an external surface with a plurality of channels, such as longitudinal channels.

Moreover, in various embodiments, the housing comprises a plurality of seats or cavities.

In various embodiments, said seats or cavities are arranged in correspondence with the channels.

By way of example, in various embodiments, the housing comprises a tubular cooling body and a cover intended to close the cooling body on one side. In particular, in various embodiments, the cooling body has on its external surface the channels and the cover comprises the seats or cavities on the side which closes the cooling body.

In various embodiments, the lighting system comprises a profiled element which can be coupled to the housing and protrudes from the housing when coupled to the housing. In particular, in various embodiments, the profiled element has at least a first engagement formation insertable into one of the channels of the housing and at least a second engagement formation insertable into one of the seats of the housing when the first engagement formation is inserted in one of the channels.

In various embodiments, for blocking the profiled element to the housing, the lighting system also comprises blocking means movable into a first and into a second operative position. In particular, when the blocking means are in the first operative position, the passage of the second engagement formation into the seat is permitted. However, when the blocking means are in the second operative position, the second engagement formation is blocked in the seat.

By way of example, in various embodiments, the blocking means are rotatable with respect to the housing and comprise a blocking ring movable between the first and the second operative position by means of a rotational movement. By way of example, said blocking ring can be arranged between the cooling body and the cover.

In various embodiments, the blocking ring comprises at least one cavity, and when the blocking ring is in the first operative position, the cavity and the channel are aligned. However, when the blocking ring is in the second operative position, the blocking ring covers a portion of the channel. By way of example, in this case the profiled element may comprise a cavity arranged in correspondence with the blocking ring when the profiled element is coupled to the housing. In this way, when the blocking ring is in the first operative position, i.e. the cavity is positioned in correspondence with the channel, the second engagement formation may be inserted in the seat of the housing. However, when the blocking ring is in the second operative position, the blocking ring covers a portion of the channel, and consequently a portion of the blocking ring is inserted in the cavity of the profiled element, blocking the second engagement formation in the seat.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1A is a schematic perspective view of an embodiment of a lighting system;

FIG. 1B is a schematic perspective view of an embodiment of a lighting system;

FIG. 1C is a schematic perspective view of an embodiment of a lighting system;

FIG. 1D is a schematic perspective view of an embodiment of a lighting system;

DETAILED DESCRIPTION

Figure 2A:
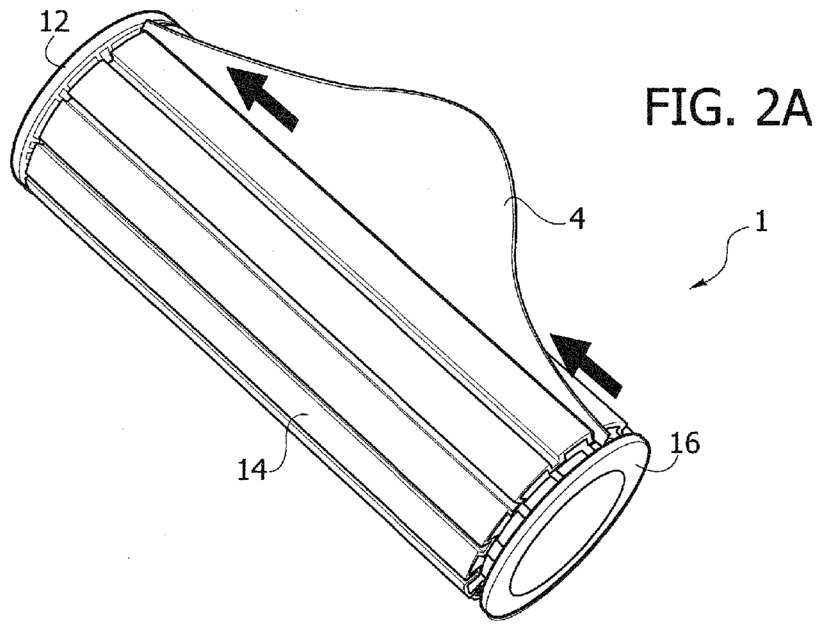
FIG. 2A is a schematic perspective view of an embodiment of a lighting system.

The following description explains various specific details aimed at providing a fuller understanding of the embodiments. The embodiments may be implemented without one or more of the specific details or using other methods, components, materials, etc. In other cases, known structures, materials or operations are not shown or described in detail so that various aspects of the embodiments may be understood more clearly.

The reference to "an embodiment" in the context of this description indicates that a particular configuration, structure or feature described in relation to the embodiment is included in at least one embodiment. Therefore, phrases such as "in one embodiment", which may occur at various points in this description, do not necessarily refer to the same embodiment. Moreover, particular forms, structures or features may be combined in any suitable manner in one or more embodiments.

The reference numbers used here are provided solely for the sake of convenience and therefore do not define the scope of protection or ambit of the embodiments.

FIGS. 1A to 1C show different perspective views of a possible embodiment of a modular lighting system 1 according to the present description.

In the embodiment considered, the lighting system 1 comprises lighting means, such as an LED module comprising at least one LED, and a housing.

As mentioned above, the housing of the lighting system 1 may be formed by a cooling body 14 comprising in the longitudinal direction a plurality of channels or ducts 140 for the passage of air.

By way of example, in the embodiment considered, the cooling body 14 has a tubular shape, i.e. the cooling body comprises axially respective openings, wherein the cooling body 14 has on its external surface the channels 140. It is preferable for the ducts 140 to be arranged in an equidistant manner. By way of example, in the case in which the cooling body 14 has a polygonal cross section, for example a rectangular cross section, the cooling body 14 may comprise a duct 140 for each side of the polygon, preferably arranged in the center of the respective side. For cylindrical shapes, however, it would be possible to use a number of ducts which is a multiple of 4, i.e. 4, 8, 12, etc., ducts 140 arranged radially.

In one embodiment, the cooling body 14 is formed as one piece, for example by means of an extrusion process.

In one embodiment, the LED module is mounted on the inside of the cooling body 14, preferably in the proximity of one of the openings, for example on the bottom side in FIG. 1A. By way of example, the LED module may be mounted on a printed circuit having a circular cross section which is fixed, for example by means of a joining system or fixing means, to the inside of the cooling body 14. Moreover, to improve the thermal connection between the LED module and the cooling body 14, the LED module can be mounted on a support made of a material with a high heat dissipation coefficient.

In one embodiment, the lighting system 1 comprises a transparent cover 16 intended to close the cooling body 14 axially on a first side, i.e. on the bottom side in FIG. 1A.

In particular, this cover 16 has an internal surface and an external surface, wherein the cover 16 closes with its internal surface the opening in the cooling body 14. By way of example, this cover 16 can be fixed, for example by means of joining or screws, to the bottom edge of the cooling body 14.

In general, this cover 16 does not necessarily have to be transparent, but may also be made of colored plastic or of various materials with different finishes.

In one embodiment, the lighting system 1 comprises a reflector for focusing the light generated by the LED module. It is preferable for this reflector to be arranged between the LED module and the cover 16. By way of example, the reflector, too, may have a circular cross section.

In one embodiment, the lighting system also comprises a drive circuit 20 for the LED module, such as an electronic converter. This drive circuit may be mounted directly on the printed circuit of the LED module or, for example in the case in which this drive circuit 20 comprises a transformer, the drive circuit 20 may be mounted on a separate printed circuit.

Figure 3A:
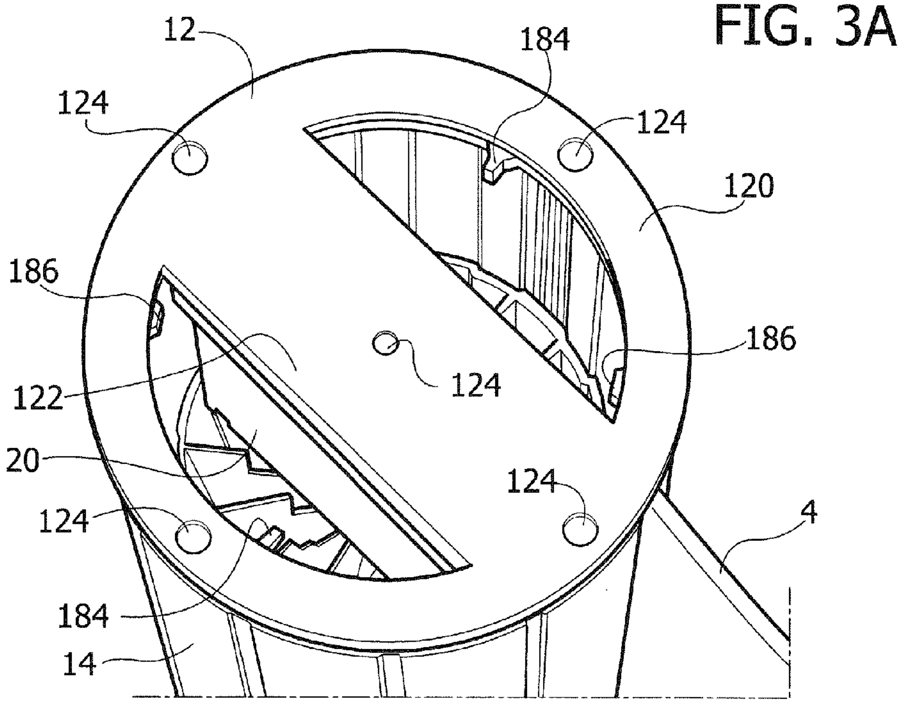
FIG. 3A is a schematic perspective view of an embodiment of a lighting system.

By way of example, in the embodiment considered, this drive circuit 20 is also mounted on the inside of the cooling body (see for example FIG. 3A). By way of example, in the embodiment considered, the drive circuit 20 is mounted on the inside of a rectangular housing, which in turn is fixed to the inside of the cooling body 14, preferably in the proximity of the top opening in the cooling body 14.

In one embodiment, the lighting system 1 also comprises a second cover 12 intended to close the cooling body 14 axially on the top side in FIG. 1A. In particular, this cover 12 has an internal surface and an external surface, wherein the cover 12 closes with its internal surface the opening in the cooling body 14. By way of example, in the embodiment considered, the cover 12 is fixed by means of screws 124 to the top edge of the cooling body 14.

In general, as also shown in FIG. 3A, it is not necessary for this cover to be solid, but rather it is sufficient for the cover 12 to comprise a frame structure 120 which corresponds substantially to the cross section of the cooling body 14. By way of example, in the embodiment shown in FIG. 3A, this frame structure 120 has an annular shape.

Moreover, in the embodiment considered, the cover 12 also comprises a rectangular portion 122 intended to close the housing of the drive circuit 20.

Consequently, part of the cooling body 14 may also remain open. By way of example, this may be advantageous for allowing the passage of air and for avoiding excessive heating of the drive circuit 20.

The solution described here allows additional decorative and/or functional elements 4 to be fixed to the lighting system 1.

In general, these profiled elements 4 comprise an engagement formation 40 which is inserted in one of the channels 140 and a second engagement formation 42 configured for cooperating with corresponding formations in the housing of the lighting system 1.

By way of example, FIG. 1B shows an embodiment in which the cover 12 comprises on its bottom side, i.e. the side which closes the cooling body 14, a plurality of seats 126, such as cavities, or blind holes or through-holes. It is preferable for these seats 126 to be arranged in correspondence with the ducts 140. By way of example, in the embodiment considered, these seats 126 are arranged in the frame structure 120 along an internal circumference line.

In this case, each additional element 4 comprises a formation 42 which is complementary to the shape of the seats 126. By way of example, in the embodiment shown in FIG. 1D, this formation 42 is a protrusion, such as a plate or a pin.

Figure 2B:
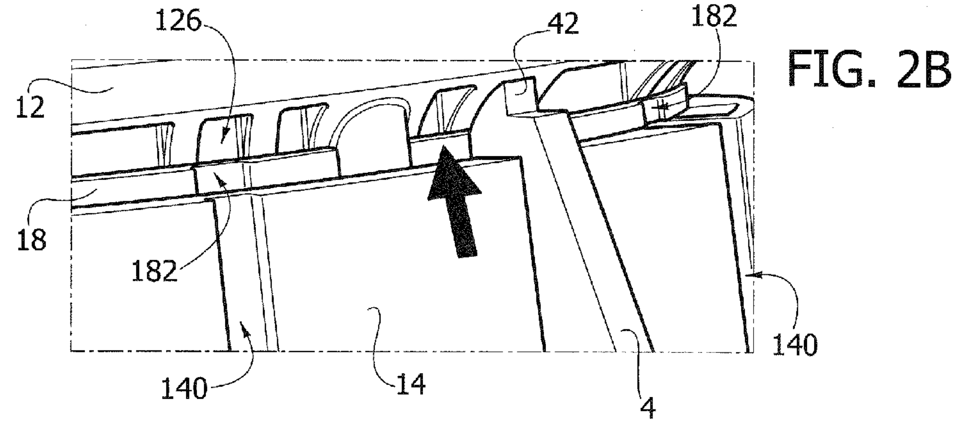
FIG. 2B is a schematic perspective view of an embodiment of a lighting system.

Consequently, for fixing an additional element 4 to the housing of the lighting system 1, the portion 40 of the additional element 4 is first inserted in one of the longitudinal ducts 140 of the housing and then pushed in the direction of the cover 12 (see for example FIGS. 2A and 2B). Consequently, the formation 42 of the element 4 is inserted in the seat 126 associated with the respective duct 140.

Consequently, in the embodiment considered, the additional element 4 is blocked radially by means of the side walls of the channels 140 and laterally by means of the coupling between the formations 42 and the seats 126. In particular, to improve stability, the portion 40 may have a thickness which corresponds substantially to the width of a duct 140.

Nevertheless, in the embodiment considered, the element is still movable in the longitudinal direction. Therefore, in one embodiment, provision is also made of a blocking mechanism which blocks the movement of the additional element 4 in the longitudinal direction.

By way of example, this blocking mechanism may be formed by simple wedge formations which are activated when the formation 42 of the element 4 is inserted in the seat 126. Nevertheless, the inventors have realized that these wedge systems are not always sufficient and/or their use is not always easy.

Therefore, in one embodiment, provision is made of a blocking ring 18 arranged between the cover 12 and the top edge of the cooling body 14. In particular, this blocking ring comprises incisions 182 in correspondence with the channels 140 and the portion 40, i.e. the portion of the additional element 4 which is inserted in the channel 140, comprises a cavity 44, such as an incision.

In this way, once the element 4 is fixed to the housing of the lighting system 1, this blocking ring 18 is turned and the edge of the blocking ring 18 is inserted in the cavity 44, blocking the additional element 4 in the longitudinal direction too. Consequently, this blocking ring 18 may be moved at least into a first operative position, in which the incisions 182 are positioned in correspondence with the channels 140, and a second operative position, in which a portion of the edge of the blocking ring 18 covers a portion of the channels 140, thereby ensuring that the additional element 4 cannot be pulled out in the longitudinal direction.

Figure 3B:
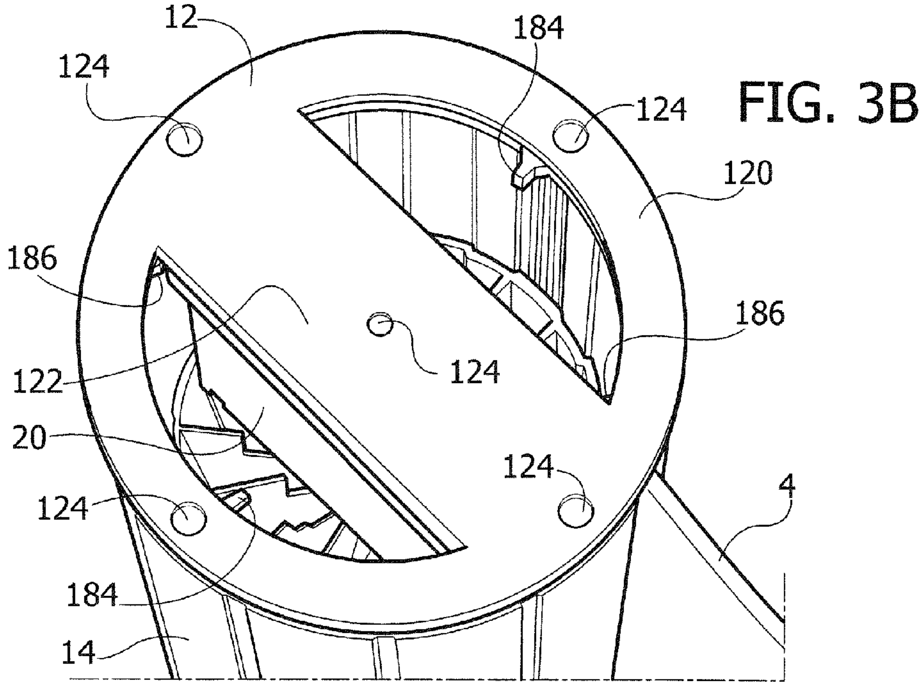
FIG. 3B is a schematic perspective view of an embodiment of a lighting system.

As shown in FIGS. 3A and 3B, this blocking ring 18 may also comprise formations 184, such as protrusions, which can be used as handles for making the rotation of the blocking ring 18 easier.

Moreover, the blocking ring 18 may comprise wedge formations 186 which cooperate with respective formations in the cover 12 for blocking the rotation of the blocking ring 18 in the first and/or second operative position.

In one embodiment, for improving the fixing stability, the additional elements 4 also comprise further formations which cooperate with respective formations in the housing of the lighting system 1, for example formations in the cooling body 14 and/or the cover 16.

By way of example, in the embodiment considered, the additional element 4 comprises a formation 46, such as a hook-shaped protrusion, configured to cooperate with the bottom edge of the cooling body 14. Consequently, when the additional element 4 is inserted in a duct 140 and the additional element is pushed upward, the formations 46 are hooked to the edge of the cooling body 14, further blocking the additional element 4 in the lateral direction.

Figure 2C:
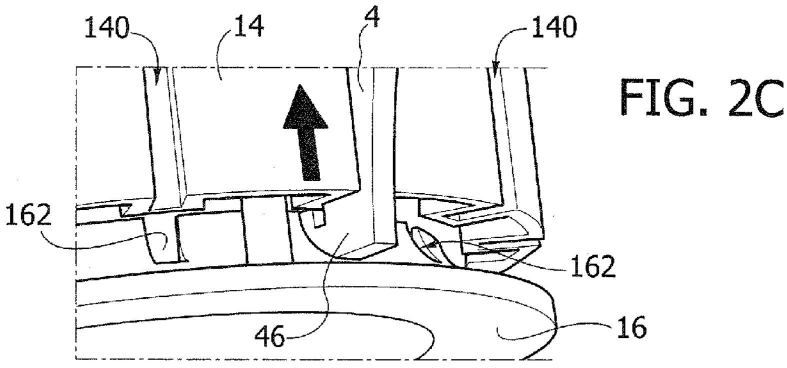
FIG. 2C is a schematic perspective view of an embodiment of a lighting system.

As also shown in FIGS. 1C and 2C, the transparent cover 16 may comprise, in this respect, lateral openings 162 arranged in correspondence with the ducts 140, these openings making it possible for the formations 46 to be inserted underneath the bottom edge of the cooling body 14.

In general, at least some of the functions of the cover 12 can also be realized by the transparent cover 16. By way of example, in one embodiment, the seats 126 are arranged in the cover 16 and, for blocking the additional element 4, the additional element 4 is pushed downward. Consequently, the blocking ring 18 could also be arranged between the cover 16 and the bottom edge of the cooling body 14.

Consequently, in the embodiments described above, the channels 140 are used not only to improve the cooling, but also to improve the stability of assembly of the additional elements 4. Moreover, in the case where additional elements 4 are not fixed to the lighting system 1, external fixing elements are not visible.

By way of example, as also described in detail in IT-TO2011A000164, the content of which is incorporated by reference in this respect, the additional element 4 may:

- form a support for resting the lighting system 1 on a table,
- support an optical element, such as a diffuser, a reflector or an optical lens, which is arranged along the path of the radiation emitted by the lighting system 1,
- form a support for fixing the lighting system 1 to a wall, and/or
- make it possible to mechanically fix together several lighting systems 1 by means of a universal fastening system, thus making it possible to form a lighting apparatus with configurations which can be personalized.

A person skilled in the art will appreciate that the appearance and form of the additional elements 4 described above may be adapted to the technical needs of the application and/or to the specific requirements of the end user. Moreover, the lighting system itself could also have different forms.

In general, the fastening system described here provides the apparatus with spatial characteristics of structural stability both in the same plane or by expanding the structure in different planes which may also not be parallel to each other.

Moreover, the solution described here has several advantages, such as:

- versatile geometric composition by interconnecting several LED sources;
- simple interconnection (no screws, springs, etc.); and
- the possibility of providing other functions (in addition to those of structural mechanics), such as mechanical supporting, heat dissipation, fastening to other mechanical/optical structures and/or variation of the esthetic appearance in terms of forms and colors.

Consequently, it is possible to provide LED lighting appliances which can be personalized (with potentially infinite configurations) using two basic components (LED source and interconnecting element). The fixing points may be rigid and/or hung from surfaces (e.g. walls, ceilings) and/or other structures (e.g. secondary optical systems).

Moreover, assembly may also be performed only at the final destination, which simplifies the transportation logistics, considering the packaging—individual and/or in kit form—both of the single sources and of the interconnecting elements.

Finally, owing to the modular nature of the lighting system, the basic lighting system may be reused, thus allowing the costs of the apparatus to be minimized, by taking advantage of the low costs for production of predefined components.

Obviously, without affecting the principle of the invention, the constructional details and embodiments may vary, also significantly, with respect to that illustrated here purely by way of non-limiting example, without thereby departing from the scope of the invention.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A lighting system comprising:

a housing for a lighting module, said housing having an external surface with a plurality of channels, and wherein said housing comprises a plurality of seats, at least one profiled element which can be coupled to said housing and protrudes from said housing when coupled to said housing, said profiled element having a first engagement formation insertable into one of said channels of said housing and a second engagement formation insertable into one of said seats of said housing when said first engagement formation is inserted in said channel, and blocking means movable into a first and into a second operative position, wherein said blocking means are configured for:

a) in said first operative position, permitting the passage of said second engagement formation into said seat, and b) in said second operative position, blocking said second engagement formation in said seat.

2. The lighting system as claimed in claim 1, wherein said blocking means are rotatable with respect to said housing between said first and said second operative position.

3. The lighting system as claimed in claim 2, wherein said blocking means comprise a blocking ring, the blocking ring comprising at least one cavity, and wherein said blocking ring is configured for:

a) when said blocking ring is in said first operative position, said cavity and said channel are aligned, and b) when said blocking ring is in said second operative position, said blocking ring covers a portion of said channel.

4. The lighting system as claimed in claim 3, wherein said blocking ring comprises a cavity for each channel.

5. The lighting system as claimed in claim 3, wherein said profiled element comprises a cavity arranged in correspondence with said blocking ring when said profiled element is coupled to said housing.

6. The lighting system as claimed in claim 1, wherein said housing comprises:

a tubular cooling body comprising axially a first and a second opening, wherein said cooling body has on its external surface said plurality of channels, and a cover having an internal surface and an external surface, wherein said cover closes with its internal surface said first opening in said cooling body.

7. The lighting system as claimed in claim 6, wherein said cover comprises said plurality of seats on its internal surface.

8. The lighting system as claimed in claim 7, wherein said blocking ring is arranged between said cooling body and said cover.

9. The lighting system as claimed in one of claim 8, wherein said profiled element has a third engagement formation configured for being coupled to the border of the second opening in said tubular cooling body.

10. The lighting system as claimed in claim 9, wherein said housing comprises a further cover configured for closing said second opening in said cooling body, and wherein said further cover comprises laterally a plurality of openings arranged in correspondence with said channels.

11. The lighting system as claimed in claim 6, wherein said blocking ring is arranged between said cooling body and said cover.

12. The lighting system as claimed in claim 6, wherein said profiled element has a third engagement formation configured for being coupled to the border of the second opening in said tubular cooling body.

13. The lighting system as claimed in claim 12, wherein said housing comprises a further cover configured for closing said second opening in said cooling body, and wherein said further cover comprises laterally a plurality of openings arranged in correspondence with said channels.

* * * * *